United States Patent
Leavitt

(10) Patent No.: US 6,412,582 B1
(45) Date of Patent: Jul. 2, 2002

(54) WHEELED CART ACCESSORY FOR SNOWMOBILES

(76) Inventor: Robert B. Leavitt, 47 Brightside Ave., Warwick, RI (US) 02889

( * ) Notice: Subject to any disclaimer, the term of this patent is extended or adjusted under 35 U.S.C. 154(b) by 0 days.

(21) Appl. No.: 09/865,107

(22) Filed: May 24, 2001

Related U.S. Application Data

(60) Provisional application No. 60/269,319, filed on Feb. 16, 2001.

(51) Int. Cl.$^7$ ............................................. B62M 29/00
(52) U.S. Cl. ..................... 180/182; 180/184; 180/198; 280/7.12
(58) Field of Search ................................ 180/182, 184, 180/185, 186, 9.21, 9.26, 9.28, 9.34, 9.3, 198; 280/415.1, 7.12, 8

(56) References Cited

U.S. PATENT DOCUMENTS

| | | | | |
|---|---|---|---|---|
| 3,149,738 A | * | 9/1964 | Bombardier | 180/182 |
| 3,437,354 A | * | 4/1969 | Hetteen | 180/182 |
| 3,480,096 A | | 11/1969 | Hammitt | |
| 3,503,620 A | * | 3/1970 | Koskovich | 180/182 |
| 3,521,717 A | * | 7/1970 | Coons | 180/185 |
| 3,570,616 A | * | 3/1971 | Tominaga | 180/185 |
| 3,664,447 A | * | 5/1972 | Kane | 180/185 |
| 3,746,195 A | * | 7/1973 | Beilke et al. | 280/43.11 |
| 3,777,829 A | * | 12/1973 | Rogers | 180/184 |
| 3,810,662 A | * | 5/1974 | Commanda | 180/182 |
| 3,822,755 A | * | 7/1974 | Hine | 180/185 |
| 3,827,589 A | * | 8/1974 | Townsend | 414/462 |
| 3,840,084 A | * | 10/1974 | Mantha | 180/184 |
| 3,860,078 A | * | 1/1975 | Stoick | 180/183 |
| 3,881,740 A | * | 5/1975 | Johnson et al. | 280/79.11 |
| 4,082,155 A | | 4/1978 | McCartney | |
| 4,195,702 A | * | 4/1980 | Denis | 180/183 |
| 4,288,087 A | * | 9/1981 | Morrison | 180/182 |
| 4,712,636 A | * | 12/1987 | Ishimatsu | 114/344 |
| 4,723,451 A | * | 2/1988 | Ishimatsu | 114/344 |
| 5,564,517 A | | 10/1996 | Levasseur | |
| 5,620,296 A | * | 4/1997 | McMahon et al. | 414/462 |
| 6,089,816 A | * | 7/2000 | Christ | 414/500 |
| 6,102,645 A | * | 8/2000 | Kooima et al. | 280/47.29 |

* cited by examiner

Primary Examiner—Brian L. Johnson
Assistant Examiner—Kelly E Campbell
(74) Attorney, Agent, or Firm—Barlow, Josephs & Holmes, Ltd.

(57) ABSTRACT

A novel solution for converting a snowmobile for use as a four-wheeled vehicle for transport or recreation when there is no snow cover on the ground. The present invention consists of an integrated chassis frame to which four wheels are attached. The front wheels are pivotally attached to the frame and interconnected by a steering linkage. The rear wheels are attached to an axle that is rotated by a chain drive linkage that is in turn driven by an arrangement of frictionally connected rubber wheels. The present invention is employed by first driving a snowmobile onto the top of the chassis. The skis at the front of the snowmobile engage into channels formed at the front of the chassis that are pivotally connected to the chassis and integrally connected to the steering linkage for translating the steering action of the snowmobile to the carts front tires. The drive action generated by the snowmobile track is frictionally transferred into the rubber tire arrangement and thereby into the rear axle to provide the power required to rotate the rear tires and drive the vehicle.

20 Claims, 6 Drawing Sheets

WHEELED CART ACCESSORY FOR SNOWMOBILES

CROSS-REFERENCE TO RELATED APPLICATIONS

This application is related to and claims priority from provisional application No. 60/269,319, filed Feb. 16, 2001.

BACKGROUND OF THE INVENTION

The present invention relates to a cart device designed to convert a track vehicle to wheeled operation. More specifically, this invention relates to a four-wheeled cart device onto which a snowmobile is driven and through which the rotation of the snowmobile tracks is translated to forward motion of the cart. The device is designed to accept a variety of makes and models of snowmobiles and provide for their operation when snow cover is insufficient.

With the unpredictability of winter weather and inconsistent snowfall in many areas of the country, many snowmobile owners have snowmobiles that sit idle in their sheds for a great many more months of the year than are used for traveling over snowy trails. Since the owners have made a sizeable investment in purchasing these machines, there is a need to find a way to expand the duration of time during the year in which these snowmobiles can be used. An option available to these owners is to bring the snowmobile further north where there is greater snowfall and a longer winter season. However, in this case as well, it is costly in terms of time and money to transport these snowmobiles further north and the time during which these expensive machines can be used is still extremely limited. Also, even in northern climates the snow disappears in the early spring not to reappear until the late fall.

The limitation inherent to the snowmobile is that while it is adept at traveling at high speeds over snow, when the snow melts it cannot travel over other terrain. This limitation arises from the use of skis as the front steering and stabilization component and rubber tracks as the rear drive component, both of which would be damaged from travel over pavement or dirt trails.

Many attempts have been made to provide for all terrain usage of snowmobiles in the form of conversion kits to replace the front skis and rear tracks with wheels. All of these prior art conversion kits are extremely difficult to employ and require a time consuming and mechanically challenging process to convert the snowmobile. For example, in the prior art, there are kits that allow conversion of a snowmobile for all terrain use that require complete disassembly of the front suspension of the snowmobile so that wheels with spring loaded spindles can be installed in their place. To install the rear wheels, the track belt must be removed, all of the spring-loaded track bogies must be taken off their spindles and then the rear wheels can be installed and connected to the drive train. Because these types of devices are time consuming to assemble and require a fair amount of mechanical ability, most snowmobile owners cannot, or will not, use them.

SUMMARY OF THE INVENTION

The present invention provides a novel solution to allow a snowmobile to be used as a four-wheeled vehicle for transport or recreation when there is no snow cover on the ground. The present invention consists of a chassis frame to which four wheels are attached. The front wheels are pivotally attached to the frame and interconnected by a steering linkage. The rear wheels are attached to an axle that is rotated by a chain drive linkage that is in turn driven by an arrangement of frictionally connected rubber wheels. A brake assembly may be provided at one or more of the wheels for stopping the vehicle.

The present invention as described above is employed by first driving a snowmobile onto the top of the chassis using a fold down ramp connected to the rear of the chassis. The skis at the front of the snowmobile engage into channels formed at the front of the chassis. The channels are pivotally connected to the chassis and integrally connected to the steering linkage. The snowmobile skis are clamped into the channels, whereby the steering action of the snowmobile is translated to a steering of the carts front tires. When the snowmobile rests on top of the chassis, the snowmobile track is aligned over, and engages with the rubber drive wheels. The drive action generated by the snowmobile track is frictionally transferred into the rubber tire arrangement and in turn, translated into the rear axle to provide the power required to rotate the rear tires and drive the vehicle. An idler wheel arrangement is provided adjacent to the transfer tire to further support the surface of the snowmobile track as it rotates. The snowmobile is generally attached to the cart device of the present invention both by the clamps and channels holding the front skis and by an attachment at the tow hitch on the rear of the snowmobile. The front and rear attachment points provide both axial and lateral stability during use.

Accordingly the object of the present invention is to provide a device for converting a track powered vehicle for use on wheels. Additionally, it is an object of the present invention to provide a device for converting a snowmobile to wheeled use with out requiring disassembly of the snowmobile. It is also an object of the present invention to create a device that allows convenient off-season use of a snowmobile that is both easy to use and that can be used with a variety of manufactured snowmobiles.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
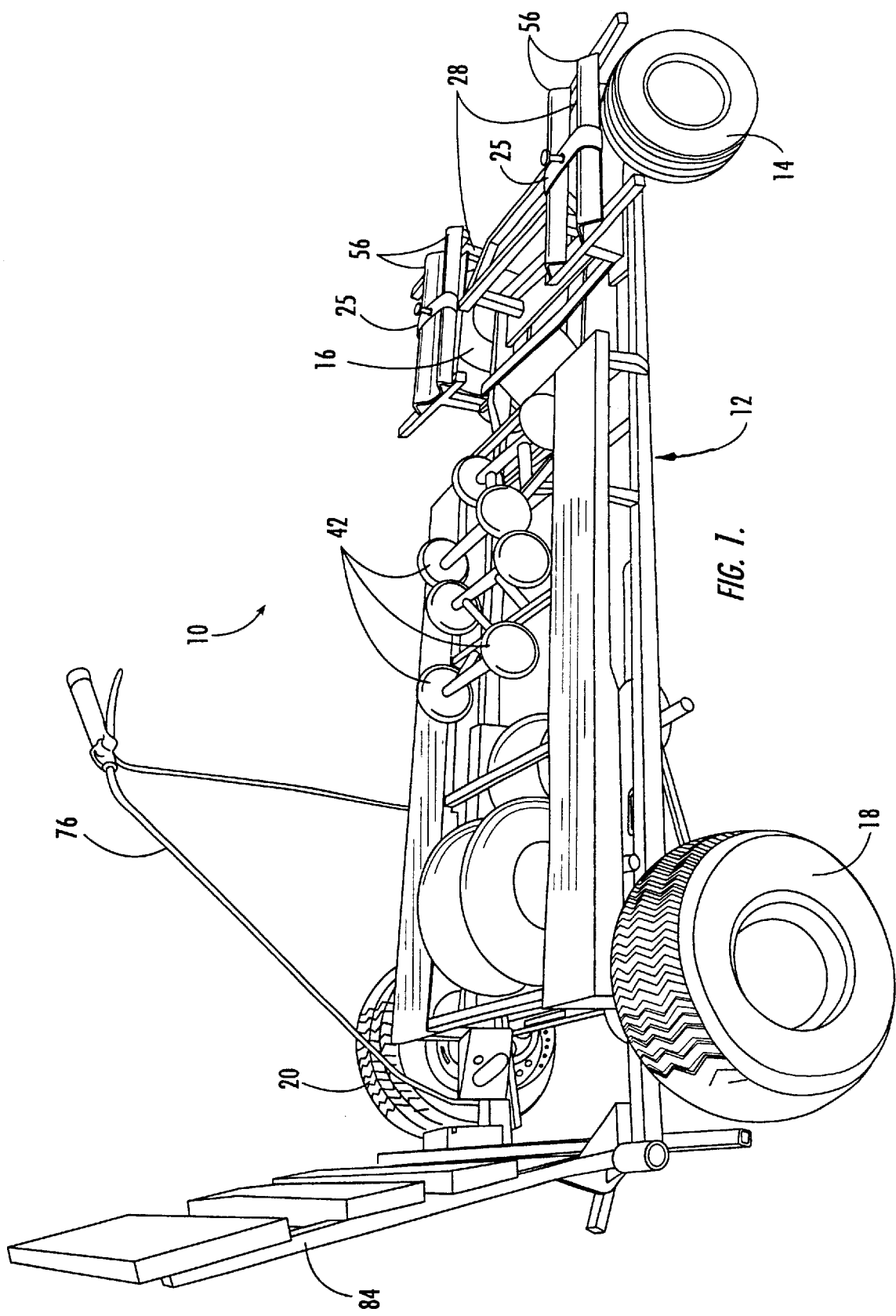
FIG. 1 is a perspective view of the snowmobile conversion device of the present invention.

Referring now to the drawings, the snow mobile conversion device of the instant invention is illustrated and generally indicated at 10 in FIGS. 1–6. As will hereinafter be more fully described, the instant invention provides for a device that allows easy conversion of a snowmobile for wheeled use without disassembly of the snowmobile. The invention provides a novel solution that offers an improvement over the prior art devices that require extensive disassembly of the snowmobile before implementation.

Figure 2:
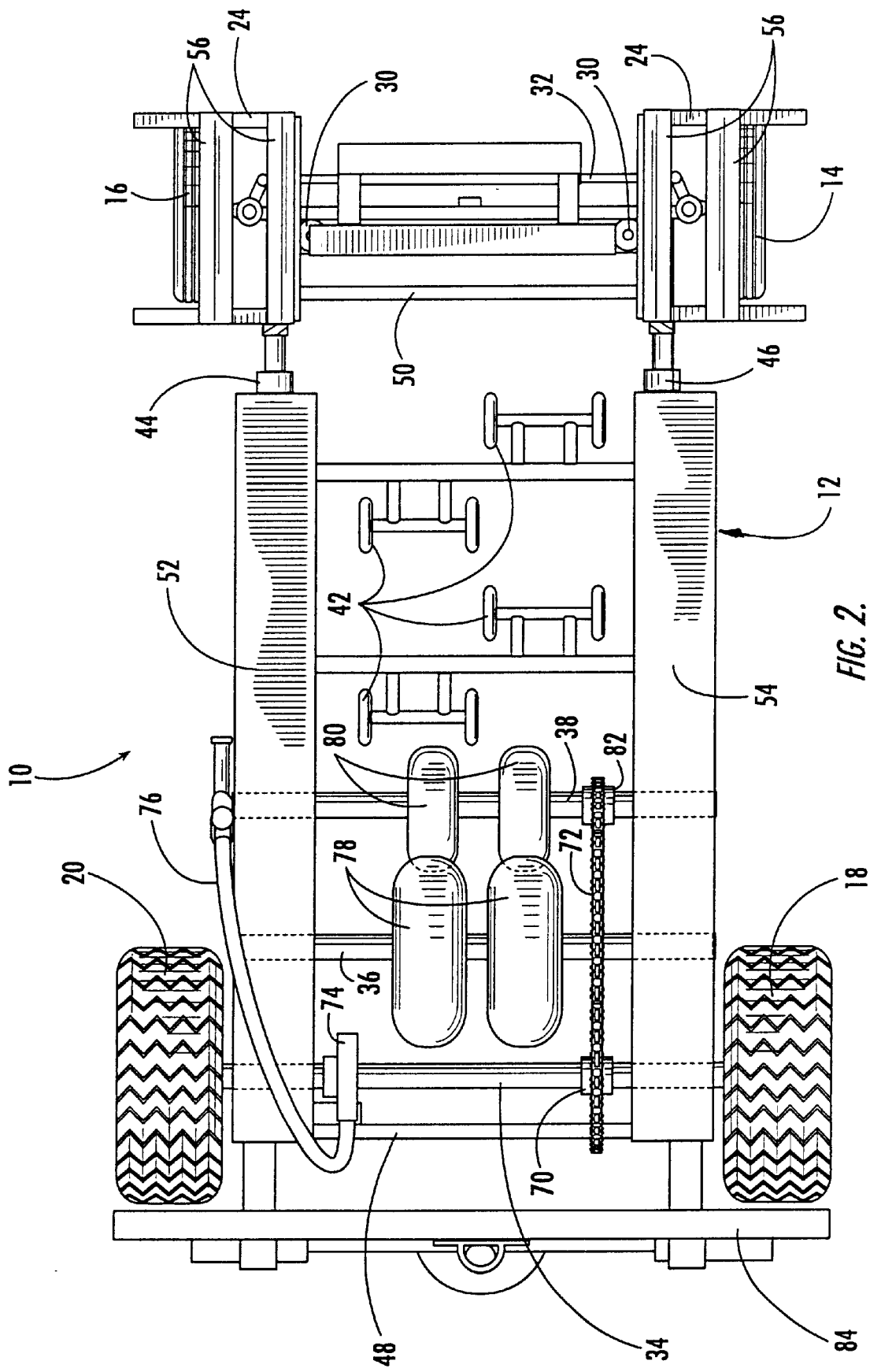
FIG. 2 is a plan view thereof.
Figure 3:
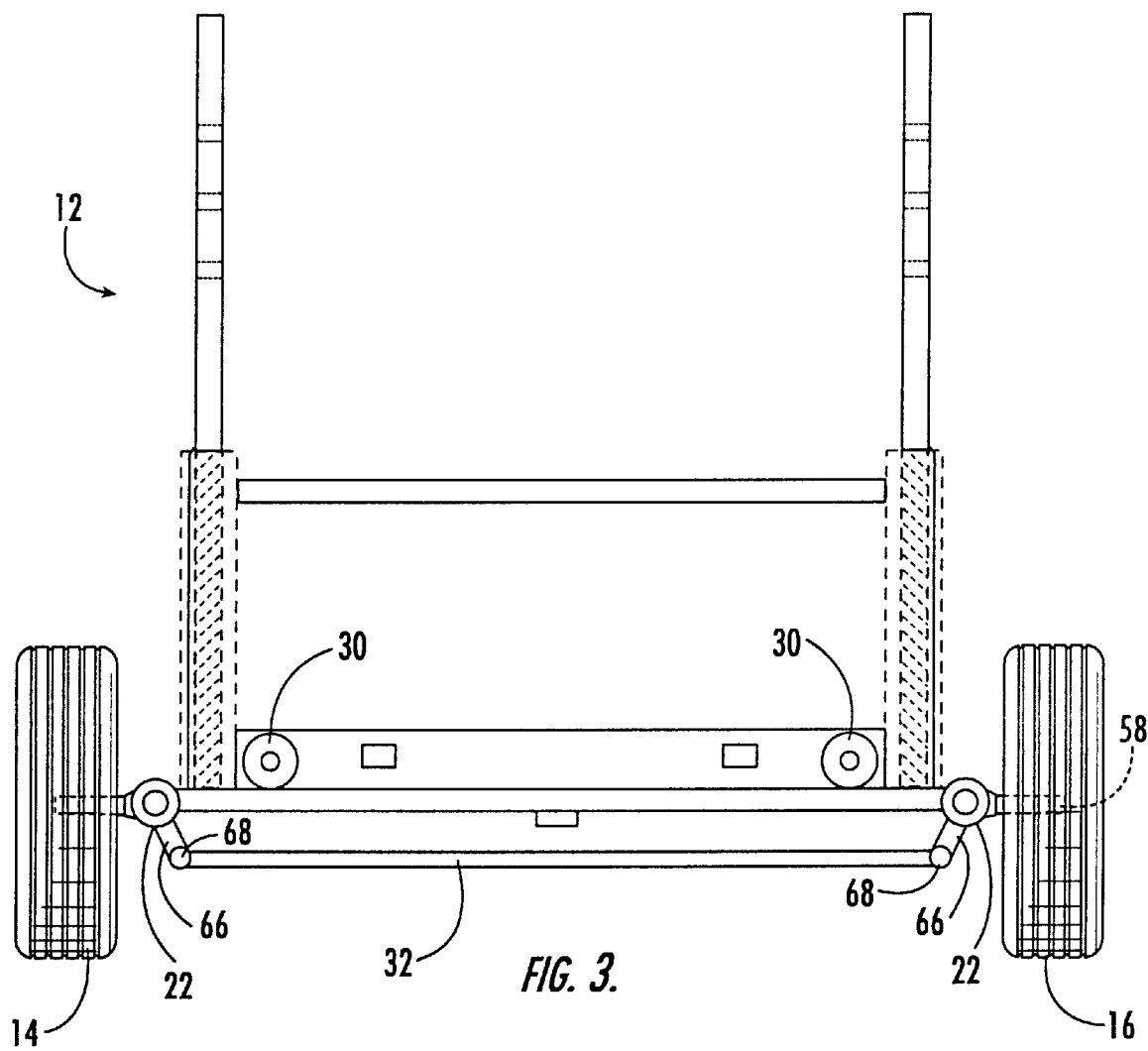
FIG. 3 is a detail plan view of the front portion of the device.
Figure 3A:
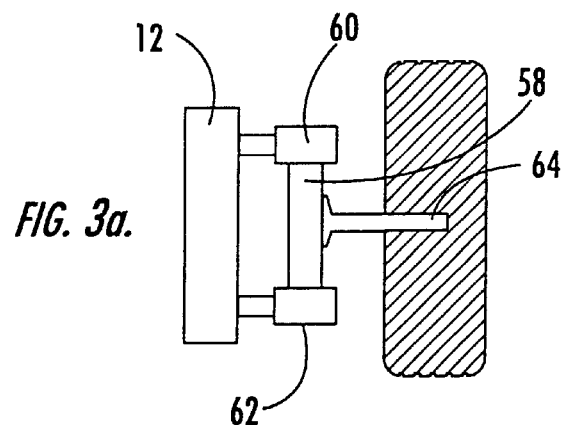
FIG. 3a is a detail view of the front wheel assembly of the device.
Figure 6:
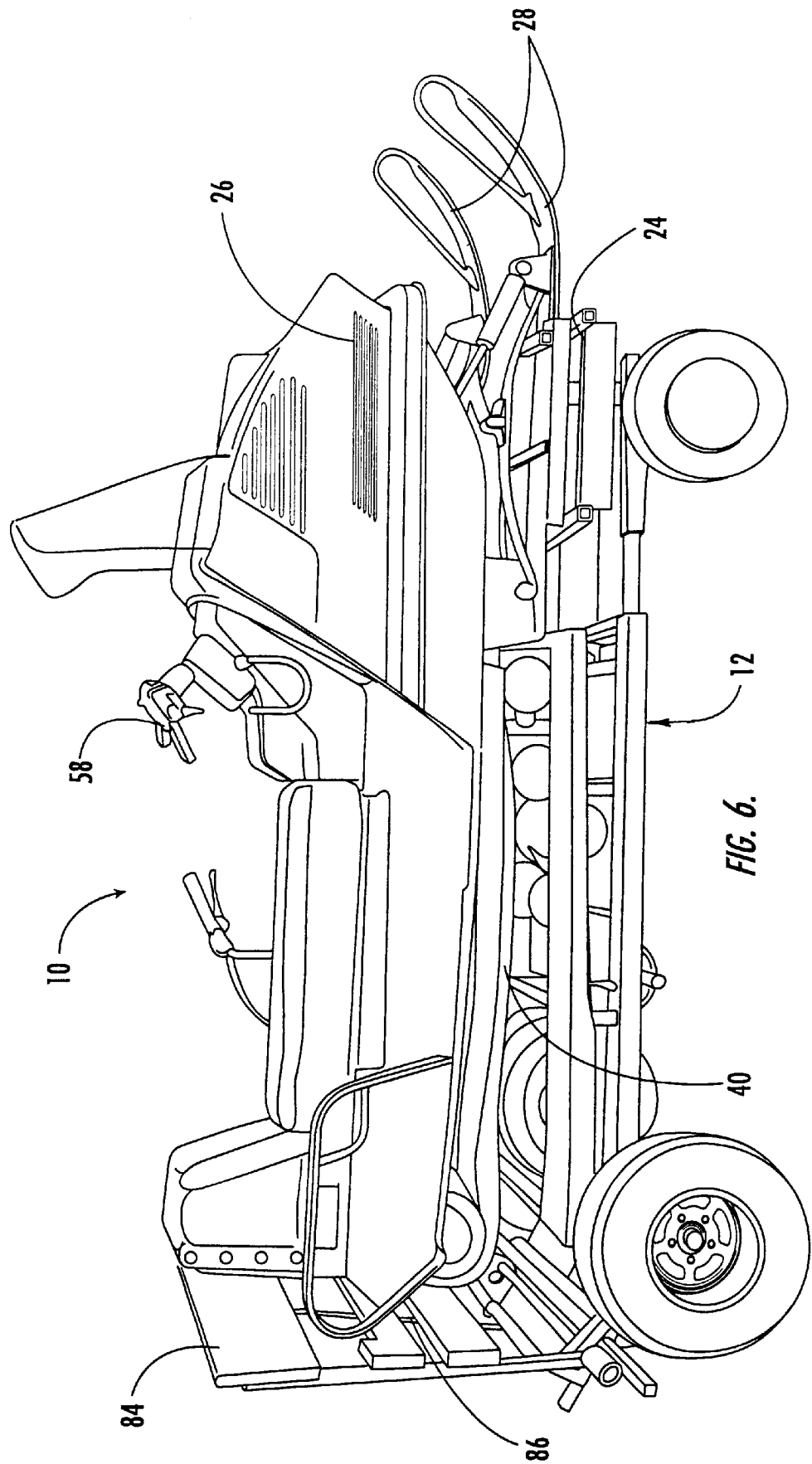
FIG. 6 is a side view thereof with a snowmobile mounted thereon.

FIG. 1 shows the present invention in a perspective view. As can be seen generally the device 10 has a structural frame 12 and four wheels 14, 16, 18 and 20 rotatably mounted to the frame. The front wheels 14, 16 are connected to the frame 12 using pivotable wheel mounts 22 that allow for the ability to steer the device 10. As is best seen in FIGS. 2 and 6 the wheel mounts 22 include mounting channels 24 into which the front skis 28 of the snowmobile 26 rest and are fastened by clamps 25. The mounting channels 24 are connected to the frame 12 using pivots 30 to allow the steering action of the front skis 28 of the snowmobile 26 to be transferred through a steering linkage 32 to the front wheels 14, 16 of the present invention 10. The rear wheels 18, 20 of the device 10 are mounted to the device 10 using an axle 34 that is rotatably mounted at the rear of the frame 12. Adjacent to the axle 34 is an arrangement of power transfer axles 36, 38 that allow for frictional transfer of the power generated by the snowmobile 26 from the track 40 of the snowmobile to the rear axle 34 subsequently driving the device 10 forward. Between the power transfer axles 36, 38 and the front mounting channels 24, several idler wheels 42 are mounted to the frame 12 to provide support for the leading edge of the snowmobile track 40 and to assist in keeping the track 40 in level and firm contact with the power transfer axle 36.

As is seen best in FIG. 2, the frame 12 of the device 10 is generally constructed having two parallel side rails 44, 46 and front and rear cross members 50, 48 connecting the side rails 44, 46. The side rails 44, 46 are constructed so as to have an adjustable length to allow the frame to be extended or shortened as required to accommodate various lengths of existing snowmobiles. The frame 12 serves as the structure to which all of the other operable components of the device 10 mount in addition to providing a firm structure to which the snowmobile 26 can be attached without modification. On the top side of the frame 12, along the length of both sides, are two longitudinal skid pads 52, 54. The skid pads 52, 54 provide a path over which the front skis 28 of the snowmobile 26 can be directed as it is driven onto the device 10 from the rear.

The skid pads 52, 54 terminate near the front of the frame 12 at the trailing edge of the front mounting channels 24. The front mounting channels 24 consist of a left and right platform mounted to the top side of the front of the frame 12 using bearings 30 to allow the mounting channels 24 to pivot. The mounting channels 24 have guides 56 fixed on their upper surface that are spaced apart so as to reside on either side of the front skis 28 of the snowmobile 26. The guides 56 properly align the snowmobile skis 28 on the device 10. Once the snowmobile 26 is mounted on the device 10, clamps are added that connect to the underside of the channel guides 56 at their peripheral edges and span over the top of the channels 56 to firmly clamp down onto the snowmobile skis 28 further retaining the skis within the channels 56. It is an important feature of the present device 10 that the snowmobile skis 28 remain retained within the channels 56 on the front mounting channels 24 as this provides stability for retaining the snowmobile 26 on the device 10 and allows translation of the steering action of the snowmobile 26 to the device.

Steering of a snowmobile 26 is accomplished by directing the front skis 28 of the snowmobile in the desired direction of travel using the snowmobile's normal handlebar 58. The prior art required the user who desired wheeled conversion of a snowmobile 26 to remove the front snowmobile skis 28 and associated suspension components to replace them with an alternate suspension assembly and a set of front wheels, thereby directly transferring the steering action from the handlebar 58 to the front wheels 14, 16. Since the present invention 10 does not require disassembly of the snowmobile 26, an alternative method for transferring the steering action was developed. The translation of the steering force begins in the front mounting channels 24. The clamps and channels 56 retaining the front skis 28 on the pivotally mounted front mounting channels 24 allow transfer of the pivotal steering motion directly into pivotal motion of the mounting channels 24. The steering action is then further transferred to the front wheels 14, 16 of the device 10 using any manner of steering linkage 32 as is well known in the art.

Figure 4:
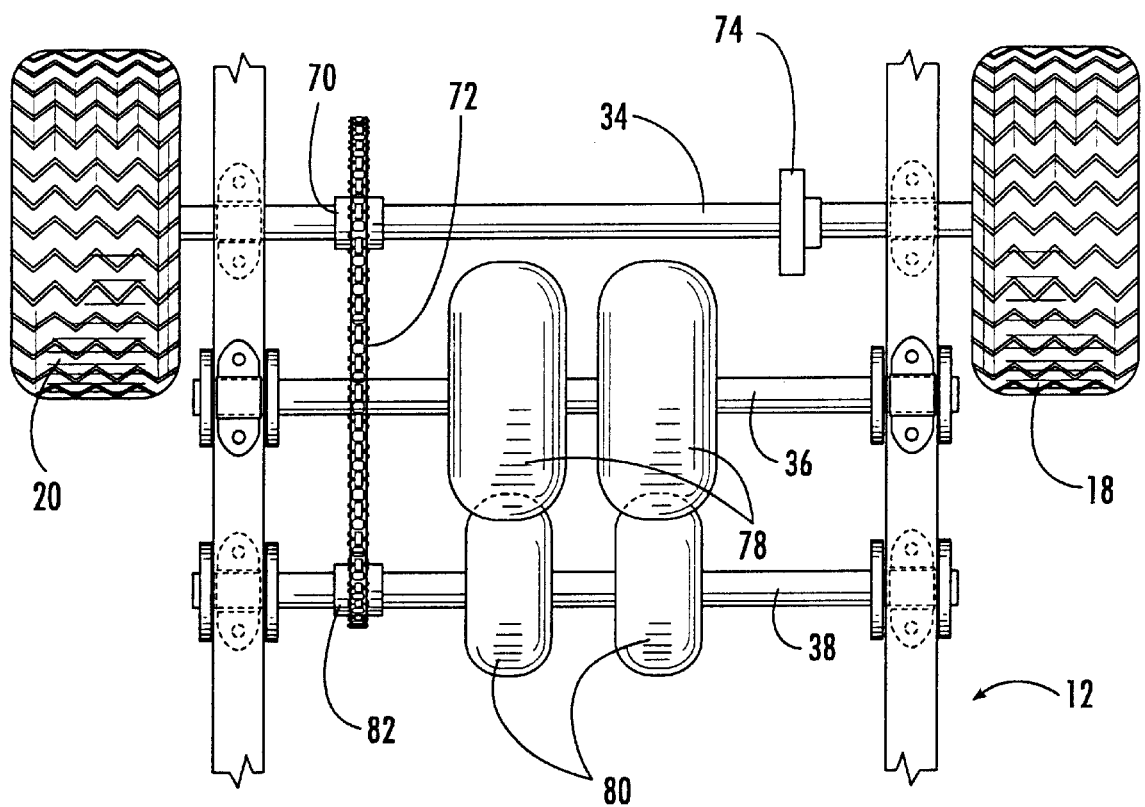
FIG. 4 is a detail plan view of the rear portion of the device.

Turning to FIGS. 4 and 4a, the left and right front wheel assemblies 22 are pivotally mounted to the underside of the frame 12. The wheel assemblies each consist of a spindle 58 with top and bottom mounting points 60, 62 to allow the spindle 58 to be firmly mounted to the frame 12 while still allowing it to pivot side to side. An axle 64 is connected to the spindle 58 to which the front wheels 14, 16 are attached. A control arm 66 is also rigidly connected to each spindle 58. At the end of each control arm 66 is a ball joint 68 for mounting a linkage 32 between the left and right wheel assembly 22 to maintain the front wheels 14, 16 in a parallel tracking relationship as they are pivoted to turn the device 10. The linkage 32 may be provided with a length adjustment to increase or decrease its length to allow adjustment of the alignment of the front wheels 14, 16 and maintain their parallel relationship.

As shown in FIG. 4, the rear wheels 18, 20 of the device 10 are connected to an axle 34 mounted to the underside of the rear of the frame assembly. In the present embodiment, the rear axle 34 is rigid but may also be constructed with a right and left axle section connected by a differential assembly as is well known in the art. The rear axle 34 provides the point of transfer allowing the snowmobile power 26 to propel the present device. In the present embodiment, a sprocket 70, or pulley wheel, is rigidly mounted to the axle 34 at a location between the frame assembly 12 side rails. Power transfer is accomplished through a belt or chain drive 72 mounted to the sprocket 70 and running to the power transfer assembly. A braking assembly 74 may be provided at the rear axle 34 using a conventional disk or drum brake arrangement installed on the rear axle 34 of the device. A long handle 76 is provided extending from the braking assembly 74 to within reach of the user on the snowmobile 26 to allow the user to activate the braking action while still seated on the snowmobile 26, thus slowing the rotation of the rear axle 34 and thereby stopping the device.

The power transfer assembly is located adjacent to the rear axle 34 and is mounted to the upper side of the frame assembly 12. The power transfer assembly consists of two power transfer axles 36, 38 mounted adjacent to one another. Both power transfer axles 36, 38 are mounted to the left and right frame rails of the frame assembly 12 using bearings to allow them to freely rotate. The first power transfer axle 36 has transfer wheels 78 mounted along its center section. The transfer wheels 78 are generally constructed with a rubber outer surface to allow good frictional contact and power transfer in the balance of the power transfer arrangement.

When the snowmobile 26 is mounted on the device 10, the rear track 40 of the snowmobile 26 rests on and is in frictional contact with the transfer wheels 78. The driving motion of the snowmobile 26, which is traditionally accomplished through the rotation of the drive track 40 against a snow covered surface, causes the transfer wheels 78 and first power transfer axle 36 to rotate in a reverse direction with respect to the device. The rubber surface of the transfer wheels 78 increases the friction between the transfer wheels 78 and snowmobile track 40 providing effective and positive power transfer.

A second transfer axle 38 is mounted adjacent to and slightly lower than the first transfer axle 36. The second transfer axle 38 also has transfer wheels 80 with a rubber surface that is in frictional contact with the transfer wheels 78 on the first transfer axle 36. This frictional contact provides for transferring the rotational energy from the first transfer axle 36 to the second transfer axle 38 and creates a rotation that is in a forward direction relative to the device 10. The second transfer axle 38 also has a sprocket 83 or pulley wheel mounted thereon corresponding to the sprocket 70 on the rear axle 34. A belt or chain drive 72 is connected between the second transfer axle 38 and the rear axle 34 to transfer the power to the rear axle 34 and drive the vehicle 10.

As can be understood, a great number of variations of the power transfer assembly can be created that allow frictional transfer of the rotational energy from the track 40 of the snowmobile 26 to the present invention 10 without modification of the snowmobile 26. The present disclosure is one example of the preferred embodiment of such a transfer but is intended to also cover any variation is transfer wheels and rotational transfer assemblies. It is also anticipated that a variety of different sizes of wheels and sprockets can be used to allow a stepping up or down of the rotational speed of the snowmobile track relative to the final rotational speed of the rear axle using adjustable gear ratios as is well know in the art. A device for articulating the first transfer axle 36 into and out of contact with the snowmobile track 40 or a similar arrangement between the first transfer axle 36 and second transfer axle 38 or in the linkage between the second transfer axle 38 and the rear axle 34 to provide for selective engagement and disengagement of the driving power of the device 10 is also provided for in the present invention.

A set of idler wheels 42 can be mounted between the side members of the frame 12 ahead of the power transfer assembly. The idler wheels 42 provide support for the leading portion of the snowmobile track 40 and allow the track suspension and subsequently the snowmobile 26 to be fully supported along the entire contact surface of the track drive 40.

Figure 5A:
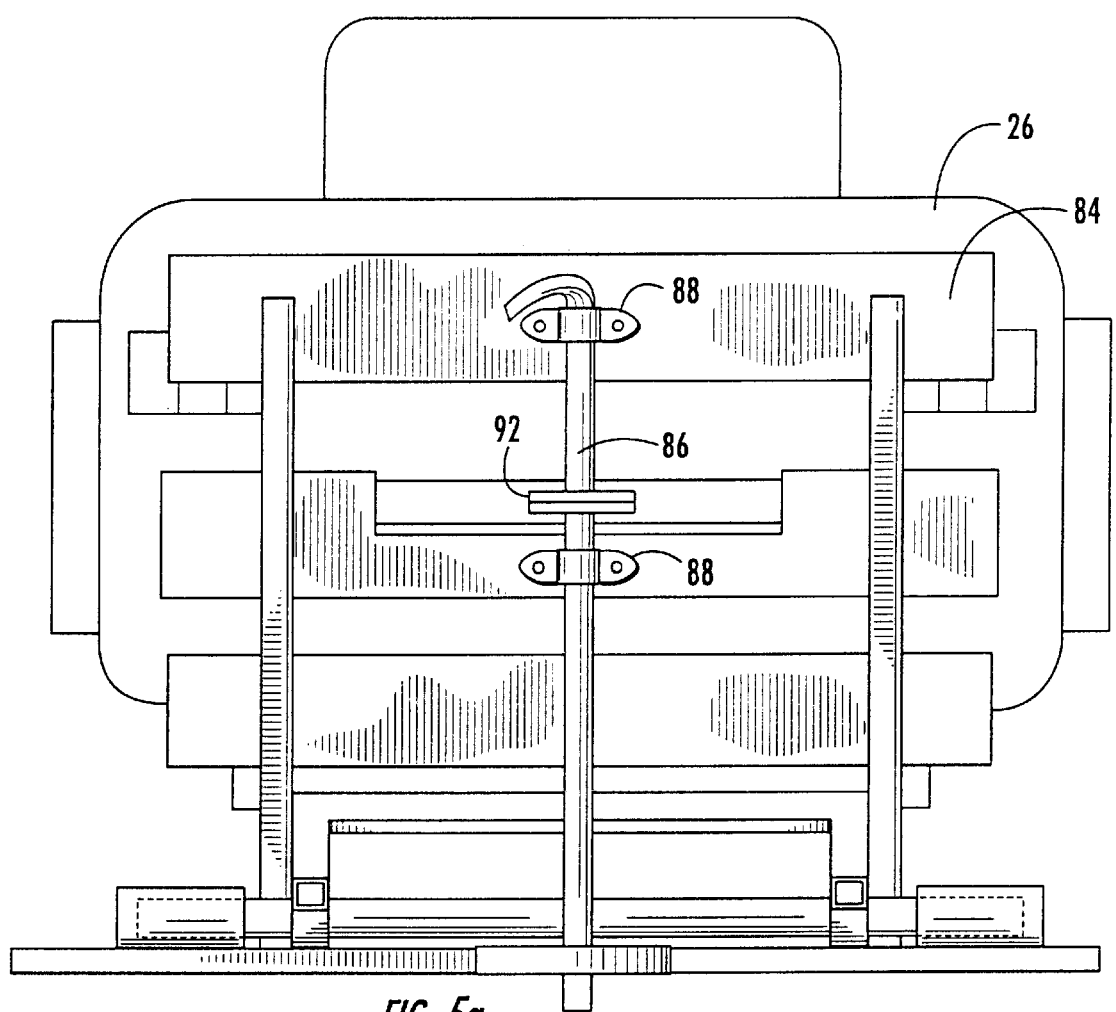
FIG. 5a is a side view of the rear portion of the device showing the loading ramp in the lowered position.
Figure 5B:
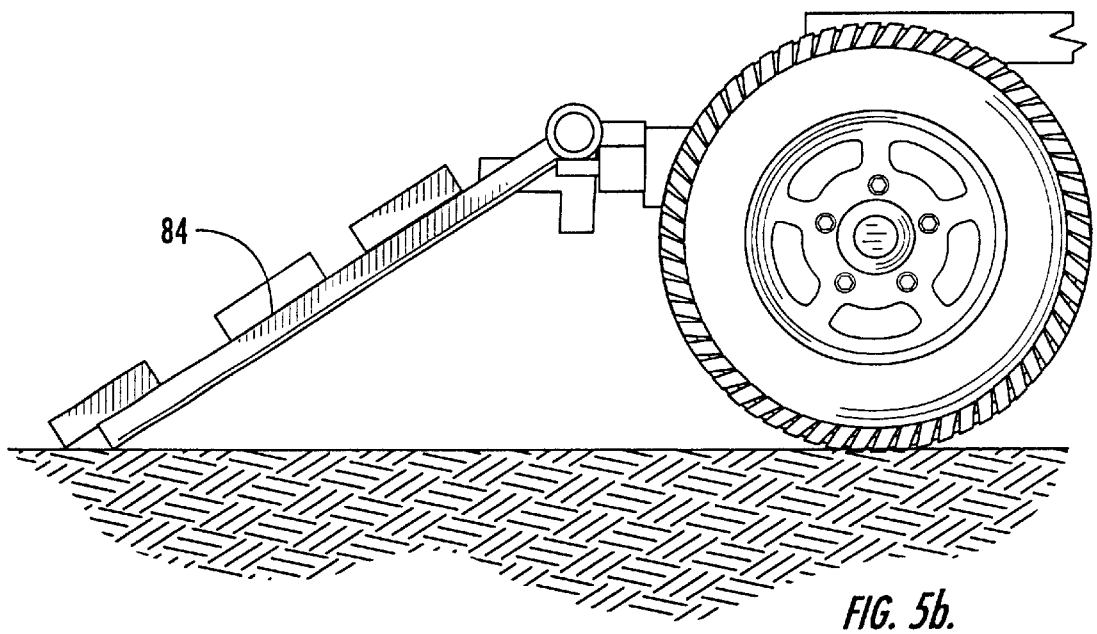
FIG. 5 is a rear view thereof showing the loading ramp in the raised position.

Turning to FIGS. 5 and 5a, a ramp 84 is provided and pivotally connected to the rear cross member 48 of the frame assembly 12. The ramp 84 is extended down to the ground to allow the user to drive the snowmobile 26 directly onto the device 10. Once the snowmobile 26 is positioned on the device 10, the ramp 84 is raised to a vertical position and is locked into place. Once in this position, the ramp 84 also provides to stabilize the rear of the snowmobile 26 and prevent lateral movement of the rear of the snowmobile 26 relative to the device 10. This is accomplished by inserting a pin 86 through two rings 88 provided on the rear surface of the ramp 84 and the standard tow hitch 92 that is provided on all manufactured snowmobiles 26. This pin 86 engages the back of the snowmobile 26 with the back of the device 10 keeping them in firm contact. The clamps discussed earlier are then installed on the front skis 28 of the snowmobile 26 thereby firmly maintaining the front connection. The snowmobile 26 is dismounted from the present invention either by removing the pin 86 and clamps that retain the snowmobile 26 on the device 10 and backing the snowmobile 26 down the ramp 84 or by driving the snowmobile 26 forward over the front of the device, which is designed to allow the snowmobile 26 to pass over the front mounting and steering assemblies without contacting them or damaging them.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for converting a snowmobile to wheeled use, said snowmobile comprising a drive track and at least one ski for steering, said device comprising:
    a frame having front and rear ends;
    a front wheel assembly rotatably supporting said front end of said frame,
        said front wheel assembly having a ski receptacle receiving said at least one ski of said snowmobile,
        said front wheel assembly being pivotally mounted to said frame to provide steering whereby steering movement of said ski causes a corresponding steering movement of said front wheel assembly;
    a rear wheel assembly rotatably supporting said rear of said frame; and
    a drive transfer assembly coupled to said rear wheel assembly, said drive transfer assembly including a drive member engaged with said drive track of said snowmobile, whereby rotation of said drive track of said snowmobile causes a corresponding rotation of said drive member and further corresponding rotation of said rear wheel assembly.

2. The device of claim 1 further comprising at least one locking member for locking said snowmobile in an operative position on said frame.

3. The device of claim 2 wherein said at least one locking member includes a locking member for holding said at least one ski of said snowmobile to said ski receptacle.

4. The device of claim 2 wherein said at least one locking member includes a locking member for holding the rear of said snowmobile in operative position on said frame.

5. The device of claim 1 wherein said front wheel assembly further comprises left and right front wheels.

6. The device of claim 1 further comprising, a brake device having a disc rigidly connected to said rear wheel assembly and a caliper rigidly connected to said frame and disposed adjacent to said disc for applying a force to stop the rotation of said rear wheel assembly.

7. The device of claim 1 further comprising, a ramp pivotally connected at said rear of said frame to drive said snowmobile onto said frame.

8. A device for converting a track vehicle to wheeled use comprising:
    a frame having a first end and a second end;
    a front wheel assembly pivotally mounted to said first end of said frame;
    a front mounting assembly comprising, left and right front mounting channels in parallel spaced relation, for receiving the front skis of said track vehicle, pivotally connected to said first end of said frame;

a steering linkage connecting said front mounting assembly to said front wheel assembly;

a rear wheel assembly rotatably mounted to said second end of said frame;

a power transfer assembly rotatably mounted to the frame adjacent to the rear axle for frictionally transferring the rotational energy from the track of a track vehicle; and a means for rotatably connecting said power transfer assembly to said rear wheel assembly.

9. The device of claim 8 wherein said front mounting assembly further comprises, a clamping device for holding the front skis of a snowmobile in said channel members.

10. The device of claim 8 wherein the space between said channel members of said front mounting assembly is adjustable.

11. The device of claim 8 wherein said frame member is adjustable to increase the length between said first end and said second end.

12. The device of claim 8 further comprising, a ramp pivotally connected to the second end of the frame member.

13. The device of claim 8 further comprising, a brake device having a disc rigidly connected to said rear wheel assembly and a caliper rigidly connected to said frame member and disposed adjacent to said disc for applying a force to stop the rotation of said rear wheel assembly.

14. The device of claim 8 wherein said a power transfer assembly comprises, a first power transfer axle having a first end, a second end and a central section, a first transfer wheel fixedly connected to said central region of said first power transfer axle and a second sprocket fixedly connected to said central region of said first power transfer axle rotatably mounted to said frame member adjacent to the rear wheel assembly; and a second power transfer axle having a first end, a second end and a central section, a second transfer wheel fixedly connected to said central region of said first power transfer axle rotatably mounted to said frame member adjacent to the first power transfer axle with said second transfer wheel in frictional contact with said first transfer wheel for frictionally transferring the rotational energy from the track of a snow mobile to said second power transfer axle.

15. A device for converting a track vehicle to wheeled use comprising:

a rectangular frame member comprising first and second side members having front ends and back ends, a front cross member having first and second ends rigidly connected to said front ends of said first and second side members, a back cross member having first and second ends rigidly connected to said back ends of said first and second side members, a top side and a bottom side;

a steering assembly comprising, left and right steering members pivotally attached to said bottom side of said front ends of said first and second side members, having a left axle member fixedly connected to said left steering member and a right axel member fixedly connected to said right steering member with left and right front wheels rotatably mounted to said left and right axels respectively;

a front mounting assembly comprising, left and right front mounting channels in parallel spaced relation, for receiving the front skis of a snowmobile, pivotally connected to said top side of said front ends of said first and second side members;

a steering linkage connecting said front mounting assembly to said steering assembly;

a rear axle having a central region, a left end and a right end, rotatably mounted to said back end of said frame member, said rear axel having left and right rear wheels fixedly connected to said left and right ends and a first sprocket fixedly secured in said central region;

a power transfer assembly comprising, a first power transfer axle having a first end, a second end and a central section, a first transfer wheel fixedly connected to said central region of said first power transfer axle and a second sprocket fixedly connected to said central region of said first power transfer axle rotatably mounted to the bottom side of the frame assembly adjacent to the rear axle; and a second power transfer axle having a first end, a second end and a central section, a second transfer wheel fixedly connected to said central region of said first power transfer axle rotatably mounted to the top side of the frame assembly adjacent to the first power transfer axle with said second transfer wheel in frictional contact with said first transfer wheel for frictionally transferring the rotational energy from the track of a snow mobile; and a means for rotatably connecting said first sprocket to said second sprocket.

16. The device of claim 15 wherein said front mounting assembly further comprises, a clamping device for holding the front skis of a snowmobile in said left and right front mounting channels.

17. The device of claim 15 wherein the space between said left front mounting channel and said right front mounting channel is adjustable.

18. The device of claim 15 wherein the first and second side members of said frame member has an adjustable length.

19. The device of claim 15 further comprising, a ramp pivotally connected to the back cross member of the frame member.

20. The device of claim 15 further comprising, a brake device having a disc rigidly connected to said rear axle and a caliper rigidly connected to said frame member and disposed adjacent to said disc for applying a force to stop the rotation of said rear axle.

* * * * *